US008840987B2

(12) United States Patent
Mallette, Sr.

(10) Patent No.: US 8,840,987 B2
(45) Date of Patent: Sep. 23, 2014

(54) INSULATION APPARATUS AND METHOD

(71) Applicant: Nash & Titus, LLC, Middleburg, VA (US)

(72) Inventor: John W Mallette, Sr., Pensacola, FL (US)

(73) Assignee: Thermal Systems Holding, LLC, Pensacola, FL (US)

( * ) Notice: Subject to any disclaimer, the term of this patent is extended or adjusted under 35 U.S.C. 154(b) by 0 days.

(21) Appl. No.: 13/694,297

(22) Filed: Nov. 16, 2012

(65) Prior Publication Data
US 2013/0129998 A1 May 23, 2013

Related U.S. Application Data

(60) Provisional application No. 61/629,432, filed on Nov. 18, 2011.

(51) Int. Cl.
B32B 7/02 (2006.01)
B32B 15/14 (2006.01)
B32B 5/18 (2006.01)
B32B 27/12 (2006.01)
B32B 15/20 (2006.01)
B32B 27/06 (2006.01)
B32B 5/02 (2006.01)
B32B 33/00 (2006.01)
B32B 9/04 (2006.01)

(52) U.S. Cl.
CPC . *B32B 7/02* (2013.01); *B32B 15/14* (2013.01); *B32B 5/18* (2013.01); *B32B 2262/062* (2013.01); *B32B 27/12* (2013.01); *B32B 15/20* (2013.01); *B32B 2307/3065* (2013.01); *B32B 27/065* (2013.01); *B32B 2307/304* (2013.01); *B32B 5/024* (2013.01); *B32B 33/00* (2013.01); *B32B 2262/0276* (2013.01); *B32B 2307/306* (2013.01); *B32B 2307/102* (2013.01); *B32B 2311/00* (2013.01); *B32B 2266/0285* (2013.01); *B32B 9/041* (2013.01); *B32B 2255/02* (2013.01); *B32B 2307/7246* (2013.01)
USPC ..... 428/213; 428/457; 428/314.4; 428/316.6; 442/136; 442/1; 29/428; 156/60

(58) Field of Classification Search
CPC .......... B32B 7/02; B32B 9/041; B32B 33/00; B32B 5/18
USPC .................. 428/457, 34.4–316.6; 442/1, 136; 29/428; 156/60
See application file for complete search history.

(56) References Cited

U.S. PATENT DOCUMENTS 5,928,971 A 7/1999 Ellis et al.
2004/0256175 A1* 12/2004 Gnadig ......................... 181/290

(Continued)

FOREIGN PATENT DOCUMENTS

WO WO2011/155968 12/2011
WO WO 2011155968 A1 * 12/2011

OTHER PUBLICATIONS

Victrex. APTIV Films. http://web.archive.org/web/20090724075635/http://www.victrex.com/en/products/aptiv-films/aptiv-films.php and http://web.archive.org/web/20090726100407/http://www.victrex.com/en/products/aptiv-films/properties/properties.php. Jul. 2009.*

Primary Examiner — Aaron Austin
Assistant Examiner — Brian Handville
(74) Attorney, Agent, or Firm — Caroline Nash; Nash & Titus, LLC

(57) ABSTRACT

A layered insulation apparatus and method of making that contains a multiple layer insulation that has a top outside moisture barrier layer, followed by a first flame retardant layer, followed by a metal layer, followed by a second flame retardant layer, and finally followed by a bottom moisture barrier outside layer. A sound abatement layer may optionally be layered on top of the first moisture barrier layer.

19 Claims, 3 Drawing Sheets

(56) References Cited

U.S. PATENT DOCUMENTS

| | | | |
|---|---|---|---|
| 2005/0150664 A1* | 7/2005 | Miller et al. | 169/45 |
| 2007/0271689 A1 | 11/2007 | Baldwin | |
| 2009/0140097 A1 | 6/2009 | Collier et al. | |

* cited by examiner

INSULATION APPARATUS AND METHOD

This application claims priority of U.S. Provisional Application Ser. No. 61/294,432, filed on Nov. 18, 2011.

BACKGROUND OF THE INVENTION

1. Field of the Invention

This invention relates to an improved insulation apparatus and method. In particular, in accordance with one embodiment, the invention relates to an improved insulation apparatus consisting of a top moisture barrier outside layer. This layer is followed by a flame retardant layer, then a metal layer, then another flame retardant layer and, finally, a bottom moisture barrier outside layer.

2. Brief Description of Related Art

Insulating and sound deadening composites are well known in the art and in particular to the recreational vehicle, boating, automobile and aviation industries, for example only. In general, machinery produces sound and heat. It is often useful and necessary to deaden as much of the sound and heat as possible. Typically, these insulating and sound deadening composites are generally composed of combinations of textile fabrics, insulating battings, and, sometimes impervious vapor barrier films. These films come in various forms including metalized films made by vapor deposition of a metal, such as Aluminum, to provide a reflective surface.

Again, such insulating and sound deadening composites are found in use with aircraft, luxury RV's, yachts, automobiles and/or racing vehicles of all types. Properly installed, these prior composites address some of the problems but often not all of them in one system and usually not for the life of the vehicle. One problem with prior art insulation products is that they are required to pass minimal FAA burn test requirements but the products that pass this test provide only minimal protection. Additionally, normal insulation in use today requires four to ten inches of space behind interior panels. The insulation normally used consists of Mylar bags filled with fiberglass batt insulation material. This material is subject to breaking down and failing. In aircraft, for example, over time the accumulation of multiple ascents and descents causes the fiberglass batt material to break down. When this occurs, if a workman accidently ruptures the bag, penetrating the bag with a tool, the fiberglass is released into the air system of the aircraft, subjecting the crew and occupants to exposure to carcinogenic particles and the aircraft owners to potential lawsuits.

A further drawback to the composites known in the art relates to their relatively ineffective and space using systems for sound deadening. A further drawback to the known composites relates to their relative ineffectiveness and the amount of space required by sound deadening products. These systems are not yet required to pass any FAA certifications, automobile or boat/yachting regulations or standards. In order to accomplish any significant sound reduction effects are large, heavy and expensive.

The current invention is an insulation that provides effective flame retardation that exceeds existing government standards. It also provides moisture prevention and sound attenuation. It is also lightweight and does not require a lot of space as it has a low profile height. The current invention does not degrade during normal use and is relatively inexpensive to construct compared to existing products.

It is therefore, an object of the invention to provide a flame, extreme heat reflecting and moisture resistant system that also provides superior sound insulation that meets or greatly exceeds existing government standards. It is further an object to provide a flame, extreme heat reflecting and moisture resistant system that reflects heat. It is a further object to provide a flame, extreme heat reflecting and moisture resistant material composition that is relatively inexpensive, lightweight and compact.

Other objects, features and advantages of the present invention will become apparent from the following detailed description of the preferred embodiment and the accompanying drawings.

SUMMARY OF THE INVENTION

A layered insulation apparatus and method of making that contains a multiple layer insulation apparatus that has a top layer moisture barrier outside layer, followed by a first flame retardant layer, followed by a metal layer, followed by a second flame retardant layer, and finally followed by a bottom moisture barrier outside layer. A sound abatement layer may optionally be layered on top of the first moisture barrier layer.

DETAILED DESCRIPTION

Figure 1:
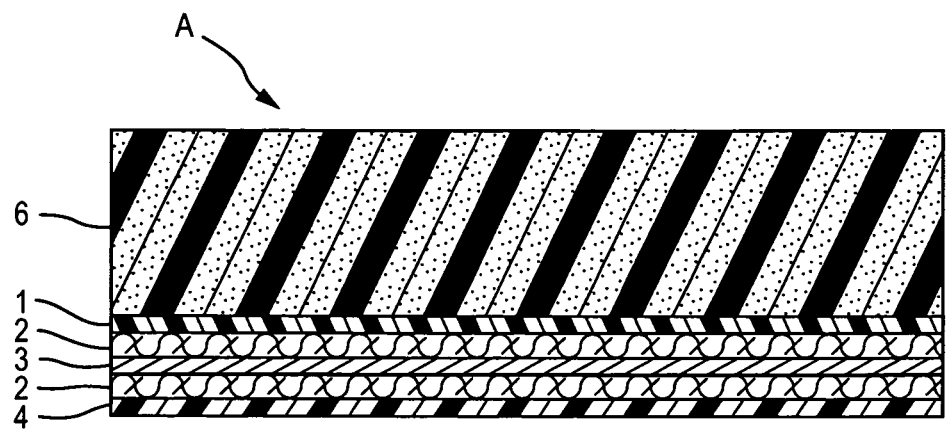
FIG. 1 is a cross sectional view of the insulation showing the multiple layers according to a first embodiment.

Definitions:

All terms used herein are given their common meaning as known to those of ordinary skill in the art.

The term "moisture barrier" is any material that creates a moisture block or barrier. Moisture barrier means that 100% of the moisture is prevented from passing through the material. Suitable moisture barriers include plastics and cellular foam materials that are now known or hereafter developed.

The term "flame retardant" describes material that is fire proof at least at some temperatures and for some length of time when exposed to flame or heat.

The term "sound abatement" is used in a common manner to describe a material that absorbs or deadens sound.

The term "ASTM" stands for the American Society for Testing and Materials. ASTM is an international standards organization that develops and publishes voluntary consensus technical standards for a wide range of materials, products, systems, and services.

The term "NFPA" stands National Fire Protection Association which is a United States trade association (albeit with some international members) that creates and maintains private, copyrighted, standards and codes for usage and adoption by local governments.

First Embodiment

In a first embodiment of the invention the insulation material is made by layering a top outside moisture barrier layer, followed by a flame retardant layer, followed by a metal layer, followed by another flame retardant layer and then by a bottom outside moisture barrier layer. A sound abatement layer may optionally be layered on top of and connected to the top outside moisture barrier layer. The sound abatement layer is closed cell foam.

In this first embodiment, the top outside moisture barrier layer is a plastic flame resistant, non-residue film. The flame retardant layer is a cloth layer. The cloth can be one hundred percent (100%) cotton or cotton muslin. It is preferred that the cotton or cotton muslin is formed in a waffle weave pattern. The metal layer is preferably aluminum. The aluminum is approximately ninety-nine percent industrial grade aluminum. The bottom moisture barrier outside layer is flame resistant, non-residing residue film.

Second Embodiment

According to a second embodiment of the invention, an improved multi-layered insulation is made of a top outside moisture barrier layer. This is followed by a flame retardant cloth layer, then an aluminum metal layer, then a spacer (polyester scrim), then another aluminum metal layer, then another flame retardant cloth layer and, finally, a bottom outside moisture barrier layer. A sound abatement layer can optionally be connected with the top outside moisture barrier layer.

In this second embodiment, the sound abatement layer is foam, fiberglass, thermo-acoustic material, rubber or wool. The cloth is one hundred percent cotton/cotton muslin. The spacer is a polyester scrim. The metal layer is aluminum of a ninety-nine percent pure industrial grade. The bottom moisture barrier outside layer is flame resistant, non-residue film.

Methods of Making:

The invention also relates to a method of making an improved insulation according to the first embodiment of the invention. The steps of making include:

layering a top outside moisture barrier layer, then a first flame retardant layer, then a metal layer, then a second flame retardant layer then a bottom outside moisture barrier layer. The method can include an additional step of layering a sound abatement layer over the top outside moisture barrier layer.

The invention also relates to a method of making an improved insulation according to the second embodiment of the invention. The steps making include:

Layering a top outside moisture barrier layer, then a first flame retardant layer, then a first metal layer, then a spacer, then a second metal layer, then a second flame retardant layer, then a bottom outside moisture barrier layer. This method can include an additional step of layering a sound abatement layer over the top outside moisture barrier layer.

Now Turning to the Figures.

FIG. 1 is a cross-sectional view of the first embodiment of the invention. As shown, the insulation A includes a top outside moisture barrier layer. This is followed by a flame retardant layer 2, then a metal layer 3, then another flame retardant layer 2 and finally a bottom outside moisture barrier layer 4. Optionally, a sound abatement layer 6 is connected with the top outside moisture barrier layer 1. This simplified embodiment is found to function extremely well and is even thinner and lighter weight than the second embodiment. However, the second embodiment with the extra layering is more suitable for harsher and more rigorous environments.

Figure 2:
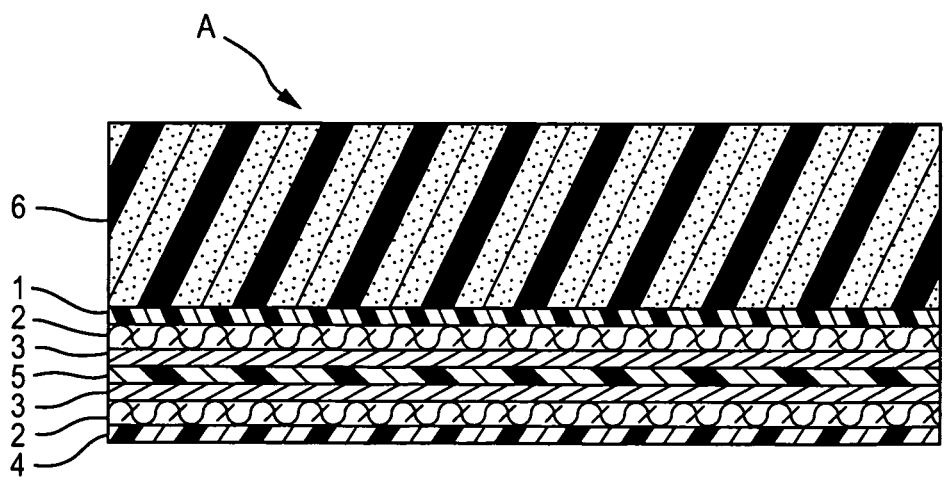
FIG. 2 is a cross sectional view of the insulation showing the multiple layers according to a second embodiment.

FIG. 2 is a cross-sectional view of the preferred second embodiment of the invention. As shown, the insulation A includes a top outside moisture barrier layer. This is followed by a flame retardant layer 2, then a metal layer 3, then a spacer layer 5, then another metal layer 3, then another flame retardant layer 2 and finally a bottom outside moisture barrier layer 4. Optionally, a sound abatement layer 6 is connected with the top outside moisture barrier layer 1.

Moisture barrier layer: While any suitable material useful for the stated purposes of the invention may be used, Applicant has determined that the layered insulation A achieves the best results when the top outside moisture barrier layer, and, also preferably, bottom moisture barrier outside layer 4 are three (3) mil clear, non-static, flame resistant, moisture proof, non-residue film, such as APTIV PEEK® (pressure sensitive) film Victrex Polymer Solutions, Succasunna, N.J. It is preferable that the moisture barrier layer has the property of having a high heat performance that can withstand lead free high heat reflection from soldering temperatures.

Flame retardant layer: Applicant has determined by testing that the layered insulation of the invention functions best when the flame retardant layer 2 is one hundred percent cotton muslin in a "waffle weave", as that term is known in the industry, coated with a flame proof coating. One type of suitable flameproof coating is Fire'Z-OFF® manufactured by RDR Technologies LLC, Oklahoma City, Okla. It is preferred that the flame proof coating be acceptable in accordance with NFPA 255, with a Class A rating.

Metal layer: Applicant has determined that the most effective insulation apparatus A, is created when the metal layer 3 is ninety-nine percent pure industrial grade, class A, class I fire certified, highly polished, paper thin aluminum sheets.

Spacer: The spacer layer 5 is most effective in the form of a polyester scrim that creates airspace between the two metal layers 3, when that configuration is presented. The Polyester Scrim is a standard production layer in the double-side aluminum. It is as thin as a piece of copy paper, about 4 mil. The purpose of the spacer layer is to add an air space between the aluminum layers.

Sound Abatement: Sound abatement layer 6 may be any sound abatement material. One example of a sound abatement layer is melamine closed cell foam. Other sound abatement materials may also be used, such as thermo-acoustic material, rubber, various leathers, balsa wood & wools. A four-inch layer of sound abatement is very effective when extra soundproofing is required. The thickness of the sound abatement layer may be adjusted to meet the particular insulation sound abatement application.

Results of Testing:

It has been shown that this combination of materials in this layered formation provides an extraordinarily effective insulation apparatus. Testing shows the invention to have passed the FAA FAR "Burn Test" in all its many parts and sections. For example, The FAA "burn test" requires a fifteen second vertical burn using a Bunsen burner with no continuous burning flame after five seconds. The present insulation lasted over nine minutes without a burn through and extinguished itself immediately when the flame was removed.

Still further, the FAA test requires a fifteen second vertical burn using a Bunsen burner with no continuous flame after five seconds. The invention met and exceeded this test.

In another test, the invention reflected heat, from the sun, for example, from the inside of an aircraft upwards of ninety-eight percent (98%). The invention reflects ambient (convective/conductive) temperatures back inside the aircraft upwards of ninety percent (90%). The invention repels moisture above and below flooring and it contains no fiberglass, carcinogenic materials or vapor deposition aluminum.

The insulation of the invention passes VOC (Volatile Organic Compounds) and SVOC (Semi-Volatile Organic Compounds) testing with virtually no contaminates detected. Further, the present invention passed the Skydrol (Jet Fuel), battery acid and blue water (urine) testing in which it was submerged for two weeks in each and did not absorb any of the fluids or, in other words, it did not absorb any of the fluids. It is preferred that the first embodiment of the insulation be about 1.4 oz per square foot and the insulation of the second embodiment be about 2.4 oz per square foot.

The layers can be held together on their edges or can be held together by other means such as gravity, friction other suitable means. The layers can be attached by simply laying the layers one on top of the other. A quilting process of 1" 2" or 3" widths can also hold the layers together. Machine quilting is accomplished using an industrial quilting machine utilizing multiple needles that sews (using various threads) across the width and/or length of the layers. It is preferred that the quilting of the layers together is through the fire retardant layers, metal layer(s) and spacer layer, and not through the moisture barrier layer. As such, the moisture barrier layer is applied as a layer after the quilting process. The moisture barrier films such as APTIV PEEK film (self-adhesive film) also holds the fabrics together.

Method of Insulating an Apparatus:

The invention also relates to a method of insulating an apparatus or vehicle. The steps of insulating include:
providing an insulation material as described above; and installing the insulation material in the apparatus or vehicle.

The insulation and method of the invention provide an all in one insulation, flame retardant, moisture retardant and sound abatement insulation apparatus. It is easy to cut with scissors or a straight blade. It installs easily. Hook and loop connections can be used for connecting edges of the insulation to a substrate (such as a vehicle or plane interior space) and it folds easily which allows it to be easily shipped and then custom fit into the desired spaces.

EXAMPLES

Example 1

Vertical Flammability Results of the Second Embodiment of the Invention

14 CFR 25.856 (c) Appendix F Part 6 vertical 12 second burn test:
Average self extinguish time may not exceed 15 seconds
Average burn length may not exceed 8"
Average dripping may not exceed 5 seconds after failing
Material Description Second embodiment

| Sample | Flame time (Seconds) | Self Extinguish (seconds) | Burn length (inches) | Drippings (seconds) |
|---|---|---|---|---|
| #1 | 12 | 0 | 2.2 | 0 |
| #2 | 12 | 0 | 2.1 | 0 |
| #3 | 12 | 0 | 1.8 | 0 |
| Average | 12.0 | 0.00 | 2.03 | 0.00 |

The insulation in this test passed the vertical flammability test.

Example 2

Flame Propagation Results

14 CFR 25.856 (c) Appendix F Part 6
Flame propagation must not exceed 2"
Self-extinguish time must not exceed 3 seconds on any sample
Material Description:
Conditioning 70 degrees+/−5, Humidity 50%+−10%, calorimeter 1.51, Thermocouple 498 degrees

| Sample | Length × width (inches) | Flame time (seconds) | Self extinguish | Flame propagation |
|---|---|---|---|---|
| #1 | 23 × 12½ | 15 | 3 | 1.4 |
| #2 | 23 × 12½ | 15 | 2 | 1.2 |
| #3 | 23 × 12½ | 15 | 2 | 1.1 |
| Average | | 15.00 | 2.33 | 1.23 |

The insulation in this test passed the flame propagation test.

Example 3

Testing of the First Embodiment of the Invention

Figure 3:
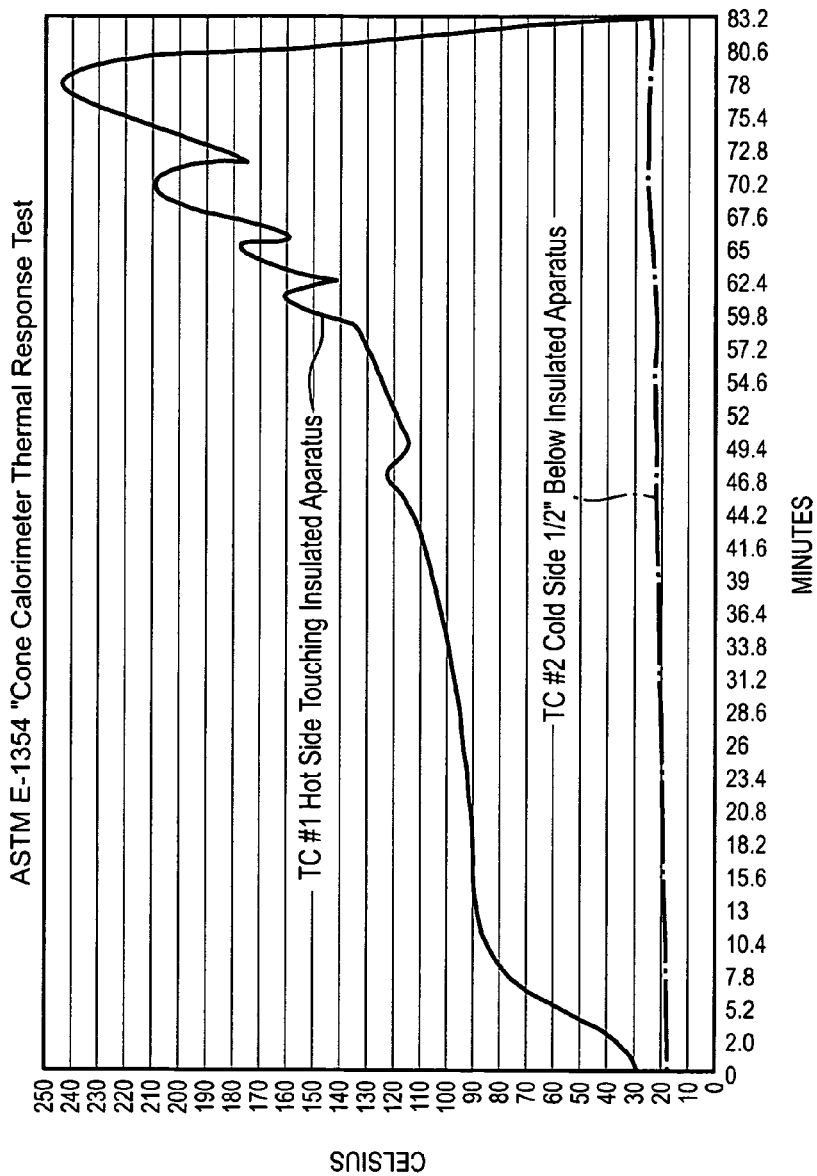
FIG. 3 is a Cone calorimeter Thermal Response test of the thermal apparatus of the invention.

The insulation of the invention was subjected to a Cone calorimeter Thermal Response Test as described in ASTM E-1354. The results are shown in FIG. 3. It is seen that the insulation prevented the heat from penetrating through the insulation even at temperatures of about 245 degrees Celsius.

Example 4

Testing of the First Embodiment of the Invention

Figure 4:
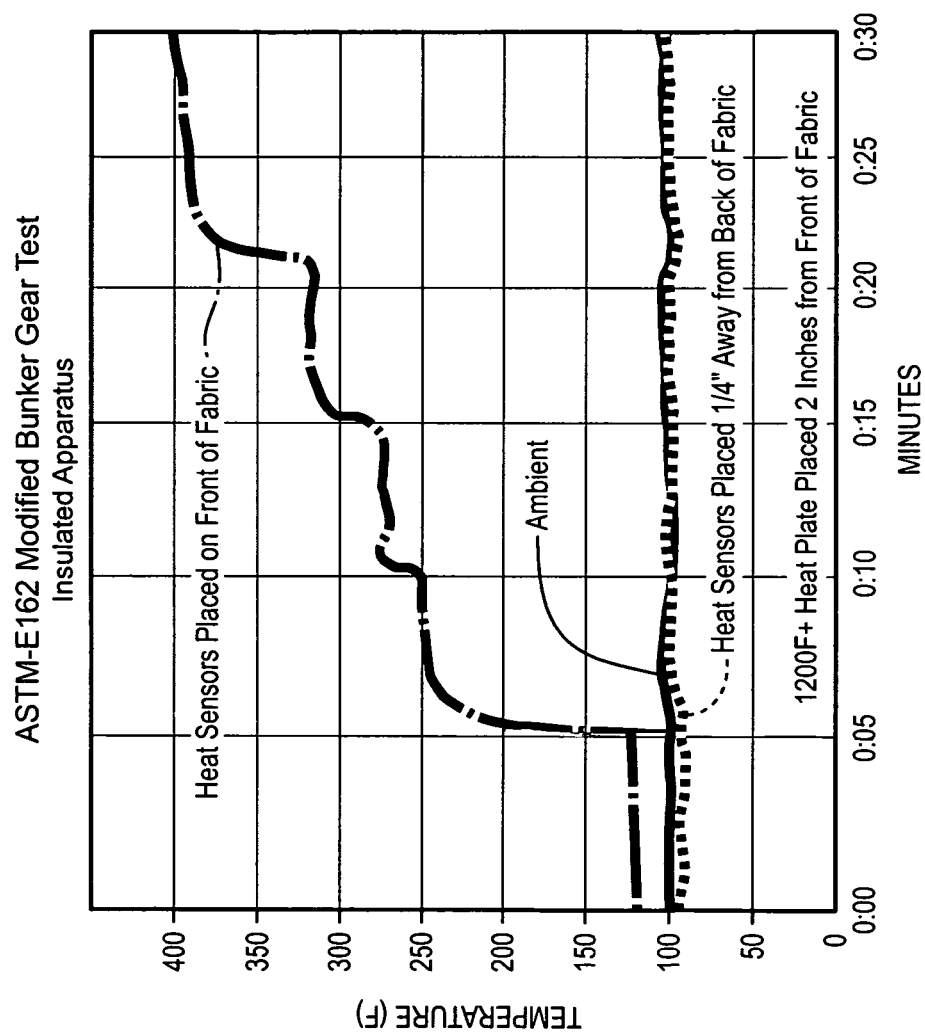
FIG. 4 is a Modified Bunker Gear Test of the Insulated Apparatus of the invention.

The insulation of the invention was subjected to a Modified Bunker Gear Test as described in ASTM-E162. The results are shown in FIG. 4. It is shown from the results that the insulation prevented the heat from penetrating through the insulation even at temperatures of about >400 degrees Fahrenheit.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as described and set forth herein.

What is claimed is:

1. A layered insulation apparatus consisting essentially of:
a top outside moisture barrier layer followed by;
a first flame retardant layer followed by;
a first polished aluminum metal layer followed by;
a spacer layer followed by;
a second polished aluminum metal layer followed by;
a second flame retardant layer; and followed by
a bottom outside moisture barrier layer.

2. The layered insulation apparatus of claim 1, further consisting essentially of a sound abatement layer.

3. The layered insulation apparatus of claim 2, wherein said sound abatement layer is on top of said top outside moisture barrier layer or said bottom outside moisture barrier layer.

4. The layered insulation apparatus of claim 2, wherein said sound abatement layer comprises melamine closed cell foam.

5. The layered insulation apparatus of claim 2, wherein the sound abatement layer is foam, fiberglass, thermo-acoustic material, rubber or wool.

6. The layered insulation apparatus of claim 1, wherein said top outside moisture barrier layer and said bottom outside moisture barrier layer are flame resistant plastic or flame resistant cellular foam.

7. The layered insulation apparatus of claim 1, wherein said first and said second flame retardant layers are each a cloth with a flame proof coating.

8. The layered insulation apparatus of claim 7, wherein said cloth is cotton muslin cloth or cotton muslin waffle weave cloth.

9. The layered insulation apparatus of claim 1, wherein said first and second polished aluminum metal layers are 99% industrial grade, class A, class I fire certified aluminum sheets.

10. The layered insulation apparatus of claim 1, wherein said bottom outside moisture barrier layer is flame resistant.

11. The layered insulation apparatus of claim 1, wherein said top outside moisture barrier layer and said bottom outside moisture barrier layer are 3 mils, clear, non-static flame resistant moisture proof non-residue film.

12. The layered insulation apparatus of claim 1, wherein said spacer layer comprises a polyester scrim that creates an air space between the first and second metal layers.

13. A layered insulation apparatus consisting essentially of:
- a top outside moisture barrier layer followed by;
- a first flame retardant layer followed by;
- a first polished aluminum metal layer followed by;
- a scrim spacer layer followed by;
- a second polished aluminum metal layer followed by;
- a second flame retardant layer; and followed by
- a bottom outside moisture barrier layer, wherein said scrim creates airspace between said first metal layer and said second metal layer.

14. The apparatus of claim 13, wherein said first and said second flame retardant layers each comprise a fabric that is coated with a flame proof coating.

15. The apparatus of claim 13, wherein said fabric is a cotton cloth.

16. The apparatus of claim 13, wherein said first and second metal layers are ninety-nine % pure industrial grade, class A, class I fire certified, highly polished aluminum sheets.

17. The layered insulation apparatus of claim 13, further consisting essentially of a sound abatement layer, said sound abatement layer selected from the group consisting of melamine closed cell foam, fiberglass, thermo-acoustic material, rubber and wool.

18. The layered insulation apparatus of claim 13, wherein said top outside moisture barrier layer and said bottom outside moisture barrier layer are flame resistant plastic or flame resistant cellular foam.

19. The layered insulation apparatus of claim 13, wherein said scrim is about 4 mil thick.

\* \* \* \* \*